United States Patent
Feng

(10) Patent No.: US 9,634,558 B2
(45) Date of Patent: Apr. 25, 2017

(54) NEGATIVE CHARGE PUMP FEEDBACK CIRCUIT

(71) Applicant: Guoyou Feng, Shanghai (CN)

(72) Inventor: Guoyou Feng, Shanghai (CN)

(73) Assignee: SHANGHAI HUAHONG GRACE SEMICONDUCTOR MANUFACTURING CORPORATION, Shanghai (CN)

( * ) Notice: Subject to any disclaimer, the term of this patent is extended or adjusted under 35 U.S.C. 154(b) by 43 days.

(21) Appl. No.: 14/578,442

(22) Filed: Dec. 21, 2014

(65) Prior Publication Data
US 2016/0181913 A1 Jun. 23, 2016

(30) Foreign Application Priority Data
Jul. 18, 2014 (CN) .......................... 2014 1 0342481

(51) Int. Cl.
| | | |
|---|---|---|
| *H03L 7/06* | (2006.01) | |
| *G05F 3/02* | (2006.01) | |
| *G05F 1/00* | (2006.01) | |
| *H02M 3/07* | (2006.01) | |

(52) U.S. Cl.
CPC ..................... *H02M 3/07* (2013.01)

(58) Field of Classification Search
CPC .......... G01R 19/0023; H03L 7/06; G05F 1/00
USPC ......... 324/76.53, 207.12; 327/156–157, 536; 323/273, 265; 363/59
See application file for complete search history.

(56) References Cited

U.S. PATENT DOCUMENTS

| | | | | |
|---|---|---|---|---|
| 2006/0139074 A1* | 6/2006 | Doi | .......................... | H02M 3/07 327/157 |
| 2007/0127277 A1* | 6/2007 | Fujiwara | .................. | H02M 3/07 363/59 |
| 2009/0066408 A1* | 3/2009 | Fujiwara | .................. | H02M 3/07 327/536 |

(Continued)

*Primary Examiner* — Tung X Nguyen
*Assistant Examiner* — Neel Shah
(74) *Attorney, Agent, or Firm* — Lau & Associates, LLC

(57) ABSTRACT

The present invention discloses a negative charge pump feedback circuit, wherein the feedback circuit is connected between an AND gate and the output terminal of the negative charge pump, and a clock signal is connected to the negative charge pump through the AND gate and under the control of the feedback signal, with the feedback circuit including a switch-capacitor circuit and a comparator; a first terminal of a first capacitor of the switch-capacitor circuit is connected to the output terminal of the negative charge pump through a first switch, and grounded through a second switch; a first terminal of a second capacitor is connected to a second terminal of the first capacitor, grounded though a third switch, and connected to the comparator though a fourth switch; an adjustable capacitor is connected in parallel to both terminals of the second capacitor; a positive-phase input terminal of the comparator is connected to a reference voltage. The switch-capacitor circuit is made to switch constantly between two states by the control of four control signals over the four switches, achieving voltage division and positive/negative voltage conversion simultaneously. The present invention can reduce the circuit area, increase the feedback speed, and reduce the output voltage ripple of the charge pump.

5 Claims, 2 Drawing Sheets

(56) References Cited

U.S. PATENT DOCUMENTS

2009/0237046 A1* 9/2009 Hsieh .................. H02M 3/07
323/273

* cited by examiner

NEGATIVE CHARGE PUMP FEEDBACK CIRCUIT

This application claims a foreign priority of Chinese Patent Application No. 201410342481.4 filed on Jul. 18, 2014, which foreign priority of Chinese Patent Application, in its entirety, is incorporated herein by reference.

FIELD OF THE INVENTION

The present invention relates to a semiconductor integrated circuit, especially to a negative charge pump feedback circuit.

BACKGROUND OF THE INVENTION

FIG. 1 is a schematic diagram of an existing negative charge pump feedback circuit; a clock signal Clock is connected to an input terminal of an AND gate 102, an output terminal of the AND gate 102 is connected to an input terminal of a negative charge pump 101, an output terminal of the negative charge pump 101 outputs a negative voltage Vneg, and the feedback circuit is connected between the output terminal of the negative charge pump 101 and another input terminal of the AND gate 102, with the feedback circuit including a comparator 103, a resistor voltage-division circuit 104 and a positive-negative voltage conversion circuit 105. The resistor voltage-division circuit 104 in FIG. 1 is formed by a plurality of resistors interconnected in series, and the connection relation between the resistors can be regulated though the control of the digital signal Dac over the switch, thereby controlling the component-voltage proportion of the resistor voltage-division circuit 104. Because what is outputted by the resistor voltage-division circuit 104 is a component voltage of the negative voltage Vneg, the component voltage still needs to be converted into a positive voltage by the positive-negative voltage conversion circuit 105. The positive-negative voltage conversion circuit 105 outputs a positive component voltage value, which is compared with a reference voltage Vref, thereby outputting a feedback voltage, i.e. a clock enable signal Clock_en, which controls whether the clock signal Clock is provided to a circuit of the charge pump 101, thus regulating the output voltage Vneg of the charge pump 101 to an expected value.

It can be seen from FIG. 1 that the resistor voltage-division circuit 104 in an existing feedback circuit is formed by a plurality of resistors interconnected in series, and will occupy a larger area; besides, the component voltage outputted by the resistor voltage-division circuit 104 is negative, and needs to be converted into a positive voltage by the positive-negative voltage conversion circuit 105, which results in a slow feedback speed, with the waveform of the output negative voltage Vneg of the negative charge pump 101 not very good.

CONTENTS OF THE INVENTION

A technical problem to be solved by the present invention is to provide a negative charge pump feedback circuit, which can reduce the circuit area, increase the feedback speed, and reduce the output voltage ripple of the charge pump.

In order to solve above technical problem, the clock signal of the negative charge pump feedback circuit of the present invention is connected to a first input terminal of an AND gate, an output terminal of the AND gate is connected to an input terminal of a negative charge pump, an output terminal of the negative charge pump outputs a negative voltage, and the feedback circuit is connected between the output terminal of the negative charge pump and a second input terminal of the AND gate, with the feedback circuit including a switch-capacitor circuit and a comparator.

The switch-capacitor circuit comprises:

a first capacitor, a first terminal of which is connected to the output terminal of the charge pump through a first switch and grounded through a second switch;

a second capacitor, a first terminal of which is connected to a second terminal of the first capacitor, grounded though a third switch, and connected to a reverse-phase input terminal of the comparator through a fourth switch;

an adjustable capacitor, which is connected in parallel to both terminals of the second capacitor;

a positive-phase input terminal of the comparator is connected to a reference voltage; an output terminal of the comparator provides a feedback signal and is connected to the second input terminal of the AND gate, with the feedback signal controlling whether the clock signal is provided to the negative charge pump to thus regulate the negative voltage outputted by the negative charge pump;

the first switch is connected to a first control signal used for controlling the switch state thereof, the second switch is connected to a second control signal used for controlling the switch state thereof, the third switch is connected to a third control signal used for controlling the switch state thereof, and the fourth switch is connected to a fourth control signal used for controlling the switch state thereof;

the switch-capacitor circuit is made to switch constantly between two states by the control of the four control signals over the four switches;

a first state of the switch-capacitor circuit is as follows: the first switch and the third switch are turned on, and the second switch and the fourth switch are turned off, with both terminals of the first capacitor being charged through the negative voltage outputted by the negative charge pump;

a second state of the switch-capacitor circuit is as follows: the first switch and the third switch are turned off, the second switch and the fourth switch are turned on, and the first capacitor, the second capacitor and the adjustable capacitor are connected in parallel between the reverse-phase input terminal of the comparator and the ground; the charge of a parallel capacitor of the three capacitors in the second state being equal to the charge of the first capacitor in the first state; a voltage inputted to the reverse-phase input terminal of the comparator being a positive voltage and proportional to a negative voltage outputted by the negative charge pump; regulating a proportional relation between the voltage of the reverse-phase input terminal of the comparator and the negative voltage outputted by the negative charge pump by regulating capacitance of the adjustable capacitor, thereby regulating the negative voltage outputted by the negative charge pump.

As a further improvement, the first capacitor, the second capacitor and the adjustable capacitor are all of an MOM capacitor or an MIM capacitor.

As a further improvement, the capacitance of the adjustable capacitor is regulated through a digital signal.

As a further improvement, the corresponding switch is turned on when the respective control signal is at a high level, and the corresponding switch is turned off when the respective control signal is at a low level; the first control signal and the third control signal are of an in-phase signal, and the second control signal and the fourth control signal are of an in-phase signal, with the high level of the second control signal and the high level of the third control signal not overlapping each other.

The present invention uses a switch-capacitor circuit to achieve the functions of voltage division and positive-negative voltage conversion simultaneously, with the switch-capacitor circuit achievable by a capacitor such as an MOM capacitor or an MIM capacitor; compared with the case in the prior art where a resistor component voltage is used, the present invention can reduce the circuit area significantly; with the switch-capacitor circuit achieving the functions of voltage division and positive-negative voltage conversion simultaneously, the present invention does not need an additional positive-negative voltage conversion circuit, and can thus increase the feedback speed and reduce the output voltage ripple of the charge pump.

BRIEF DESCRIPTION OF THE DRAWINGS

The present invention will be further described below in detail with reference to drawings and embodiments.

DETAILED DESCRIPTION OF THE EMBODIMENTS

Figure 1:
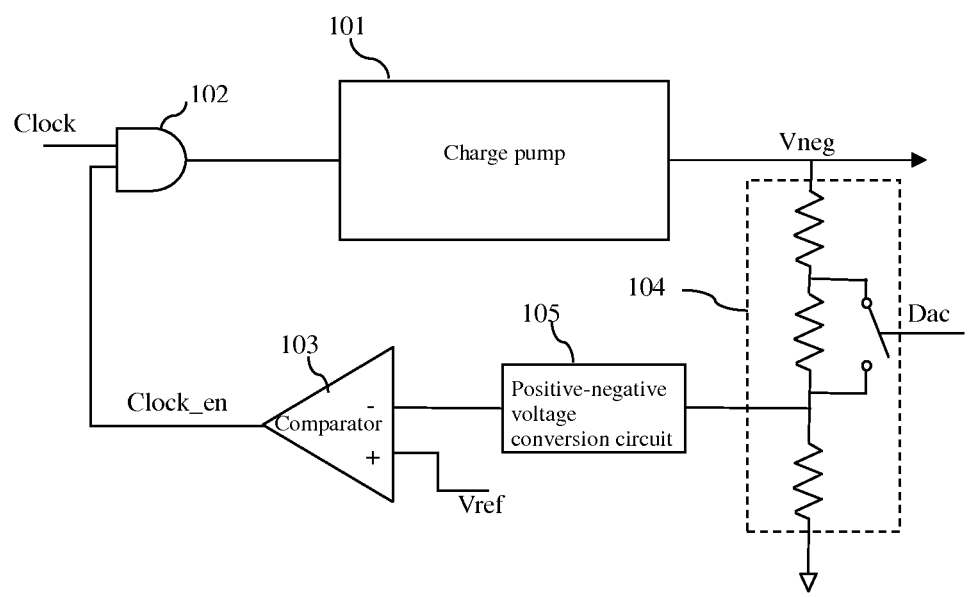
FIG. 1 is a schematic diagram of an existing negative charge pump feedback circuit.
Figure 2:
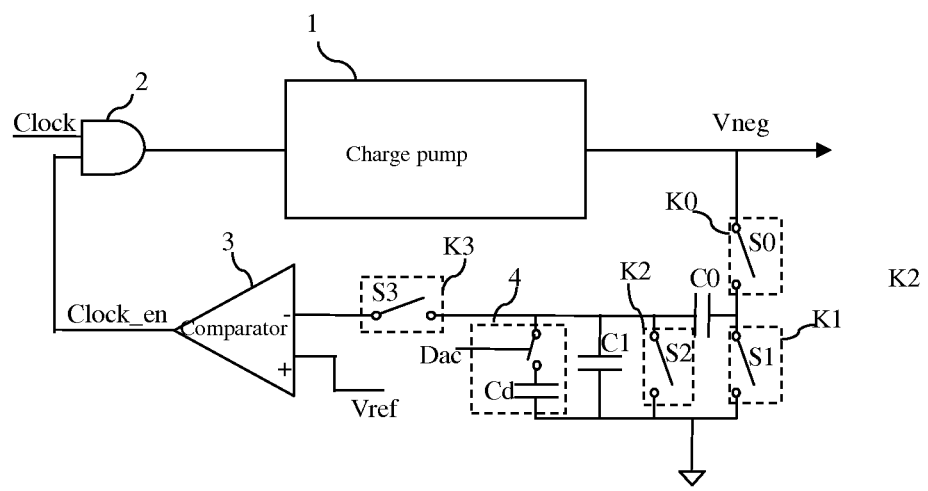
FIG. 2 is a schematic diagram of the negative charge pump feedback circuit according to an example of the present invention.

FIG. 2 is a schematic diagram of the feedback circuit of the negative charge pump 1 according to an example of the present invention. In the feedback circuit of the negative charge pump 1 according to the example of the present invention, a clock signal Clock is connected to a first input terminal of an AND gate 2, an output terminal of the AND gate 2 is connected to an input terminal of a negative charge pump 1, an output terminal of the negative charge pump 1 outputs a negative voltage Vneg, and the feedback circuit is connected between the output terminal of the negative charge pump 1 and a second input terminal of the AND gate 2, with the feedback circuit including a switching capacitor circuit and a comparator 3.

The switching capacitor circuit comprises:

a first capacitor C0, a first terminal of which is connected to the output terminal of the charge pump 1 through a first switch K0 and grounded through a second switch K1;

a second capacitor C1, a first terminal of which is connected to a second terminal of the first capacitor C0, grounded though a third switch K2, and connected to a reverse-phase input terminal of the comparator 3 through a fourth switch K3;

an adjustable capacitor 4, which is connected in parallel to both terminals of the second capacitor C1; preferably, the adjustable capacitor 4 is composed of a capacitor group Cd and the corresponding switch group, with the capacitance of the entire adjustable capacitor 4 regulated through control of the digital signal Dac over the switch group;

a positive-phase input terminal of the comparator 3 is connected to a reference voltage Vref; an output terminal of the comparator 3 provides a feedback signal, i.e. a clock enable signal Clock_en, and is connected to the second input terminal of the AND gate 2, with the feedback signal Clock_en controlling whether the clock signal Clock is provided to the negative charge pump 1 to thus regulate the negative voltage Vneg outputted by the negative charge pump 1;

the first switch K0 is connected to a first control signal S0 used for controlling the switch state thereof, the second switch K1 is connected to a second control signal 51 used for controlling the switch state thereof, the third switch K2 is connected to a third control signal S2 used for controlling the switch state thereof, and the fourth switch K3 is connected to a fourth control signal S3 used for controlling the switch state thereof;

the switching capacitor circuit is made to switch constantly between two states by the control of the four control signals over the four switches;

a first state of the switching capacitor circuit is as follows: the first switch K0 and the third switch K2 are turned on, and the second switch K1 and the fourth switch K3 are turned off, with both terminals of the first capacitor C0 being charged through the negative voltage Vneg outputted by the negative charge pump 1;

a second state of the switching capacitor circuit is as follows: the first switch K0 and the third switch K2 are turned off, the second switch K1 and the fourth switch K3 are turned on, and the first capacitor C0, the second capacitor C1 and the adjustable capacitor 4 are connected in parallel between the reverse-phase input terminal of the comparator 3 and the ground, the charge of a parallel capacitor of the three capacitors in the second state being that of the first capacitor C0 in the first state, a voltage inputted to the reverse-phase input terminal of the comparator 3 being a positive voltage and proportional to a negative voltage Vneg outputted by the negative charge pump 1; this proportion can be indicated by the following formula:

$-C0/(C0+C1+Cd)$; wherein C0 represents the capacitance of the first capacitor C0, C1 represents the capacitance of the second capacitor C1, and Cd represents the capacitance of the adjustable capacitor 4;

regulating a proportional relation between the voltage of the reverse-phase input terminal of the comparator 3 and the negative voltage Vneg outputted by the negative charge pump 1 by regulating the capacitance of the adjustable capacitor 4, thereby regulating the negative voltage Vneg outputted by the negative charge pump 1; the negative voltage Vneg outputted by the negative charge pump 1 can be indicated by the following formula:

$Vneg = Vref \times (C0 - PCD/C0 + Vref \times Cd/C0$; wherein Vneg represents the negative voltage Vneg outputted by the negative charge pump 1, and Vref represents the value of the reference voltage Vref.

Preferably, the first capacitor C0, the second capacitor C1 and the adjustable capacitor 4 are all of an MOM capacitor or an MIM capacitor, which can reduce the circuit area significantly.

Figure 3:
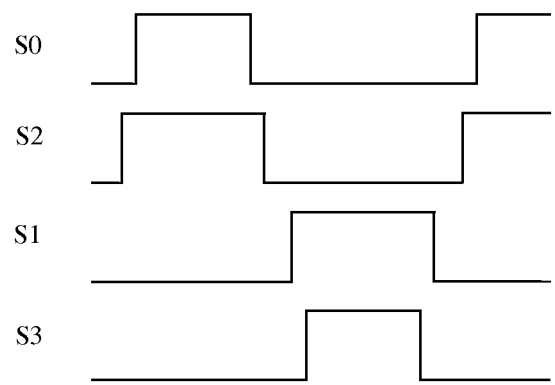
FIG. 3 is a timing diagram of the control signal of the switch-capacitor circuit according to an example of the present invention.

The corresponding switch is turned on when the respective control signal is at a high level, and the corresponding switch is turned off when the respective control signal is at a low level. FIG. 3 is a timing diagram of the control signal of the switch-capacitor circuit according to an example of the present invention. The first control signal S0 and the third control signal S2 are of an in-phase signal, and the second control signal 51 and the fourth control signal S3 are of an in-phase signal, with the high level of the second control signal 51 and the high level of the third control signal S2 not overlapping each other. Preferably, the width of the high level of the third control signal S2 is slightly greater than the width of the high level of the first control signal S0: that is, when switching to the first state, first the third switch K2 is turned on, and then the first switch K0 is turned on; when the first state is over, first the first switch K0 is turned off, and then the third switch K2 is turned off. The width of the high level of the second control signal 51 is slightly greater than the width of the high level of the fourth control signal S3: that is, when switching to the second state, first the second switch K1 is turned on, and then the fourth switch K3 is turned on; when the second state is over, first the fourth switch K3 is turned off, and then the second switch K1 is turned off.

The present invention is described above in detail through specific examples, which however do not restrict the present invention. Without departing from the principle of the present invention, those skilled in the art can also make many variations and improvements, which should also be considered to be within the scope of protection of the present invention.

What is claimed is:

1. A negative charge pump feedback circuit, comprising: a clock signal is connected to a first input terminal of an AND gate, an output terminal of the AND gate is connected to an input terminal of a negative charge pump, an output terminal of the negative charge pump outputs a negative voltage, and the feedback circuit is connected between the output terminal of the negative charge pump and a second input terminal of the AND gate, with the feedback circuit including a switch-capacitor circuit and a comparator;

the switch-capacitor circuit comprises:
a first capacitor, a first terminal of which is connected to the output terminal of the charge pump through a first switch and grounded through a second switch;
a second capacitor, a first terminal of which is connected to a second terminal of the first capacitor, grounded though a third switch, and connected to a reverse-phase input terminal of the comparator through a fourth switch;
an adjustable capacitor, which is connected in parallel to both terminals of the second capacitor;
a positive-phase input terminal of the comparator is connected to a reference voltage; an output terminal of the comparator provides a feedback signal and is connected to the second input terminal of the AND gate, with the feedback signal controlling whether the clock signal is provided to the negative charge pump to thus regulate the negative voltage outputted by the negative charge pump;
the first switch is connected to a first control signal used for controlling the switch state thereof, the second switch is connected to a second control signal used for controlling the switch state thereof, the third switch is connected to a third control signal used for controlling the switch state thereof, and the fourth switch is connected to a fourth control signal used for controlling the switch state thereof;
the switch-capacitor circuit is made to switch constantly between two states by the control of the four control signals over the four switches;
a first state of the switch-capacitor circuit is as follows: the first switch and the third switch are turned on, and the second switch and the fourth switch are turned off, with both terminals of the first capacitor being charged through the negative voltage outputted by the negative charge pump;
a second state of the switch-capacitor circuit is as follows: the first switch and the third switch are turned off, the second switch and the fourth switch are turned on, and the first capacitor, the second capacitor and the adjustable capacitor are connected in parallel between the reverse-phase input terminal of the comparator and the ground, the charge of a parallel capacitor of the three capacitors in the second state being equal to that of the first capacitor in the first state, a voltage inputted to the reverse-phase input terminal of the comparator being a positive voltage and proportional to a negative voltage outputted by the negative charge pump; regulating a proportional relation between the voltage of the reverse-phase input terminal of the comparator and the negative voltage outputted by the negative charge pump by regulating capacitance of the adjustable capacitor, thereby regulating the negative voltage outputted by the negative charge pump.

2. The negative charge pump feedback circuit according to claim 1, wherein the first capacitor, the second capacitor and the adjustable capacitor are all of an MOM capacitor or an MIM capacitor.

3. The negative charge pump feedback circuit according to claim 2, wherein the capacitance of the adjustable capacitor is regulated through a digital signal.

4. The negative charge pump feedback circuit according to claim 1 wherein the capacitance of the adjustable capacitor is regulated through a digital signal.

5. The negative charge pump feedback circuit according to claim 1, wherein the corresponding switch is turned on when the respective control signal is at a high level, and the corresponding switch is turned off when the respective control signal is at a low level; the first control signal and the third control signal are of an in-phase signal, and the second control signal and the fourth control signal are of an in-phase signal, with the high level of the second control signal and the high level of the third control signal not overlapping each other.

* * * * *